United States Patent [19]

Hanagan et al.

[11] Patent Number: 5,163,358
[45] Date of Patent: Nov. 17, 1992

[54] TWO-IN-ONE BARBEQUE GRILL

[75] Inventors: Joseph J. Hanagan, Frederick R. Wells, both of Freeport, Ill.

[73] Assignee: The Thermos Company, Inc., Freeport, Ill.

[21] Appl. No.: 737,587

[22] Filed: Jul. 25, 1991

Related U.S. Application Data

[63] Continuation of Ser. No. 338,309, Apr. 14, 1989, abandoned.

[51] Int. Cl.$^5$ .......................... A47J 37/00; A47J 37/07
[52] U.S. Cl. ........................................ 99/339; 99/340; 99/400; 99/401; 99/421 H; 99/444; 99/447; 99/448; 99/450; 126/25 R; 126/41 R
[58] Field of Search ................. 99/339, 400, 340, 401, 99/419, 421 R, 421 H, 444-446, 447, 448, 450, 482; 126/25 R, 9 R, 41 R; 431/326, 328

[56] References Cited

U.S. PATENT DOCUMENTS

| | | | |
|---|---|---|---|
| 2,597,127 | 5/1952 | Rahr | 99/447 |
| 3,019,720 | 2/1962 | Topper | 99/339 |
| 3,444,805 | 5/1969 | Happel et al. | 99/447 |
| 3,463,139 | 10/1967 | Hayashi et al. | |
| 3,552,301 | 1/1971 | McNeff | |
| 3,611,915 | 10/1971 | Glaser et al. | |
| 3,657,996 | 4/1972 | Thompson | |
| 3,667,376 | 6/1972 | Thompson | |
| 3,667,449 | 6/1972 | Persinger et al. | |
| 3,742,838 | 7/1973 | Luschen et al. | 126/25 R |
| 3,785,275 | 1/1974 | Keats et al. | |
| 3,794,013 | 2/1974 | Upton | |
| 3,870,031 | 3/1975 | Krüper | |
| 3,931,805 | 1/1976 | Nelson | |
| 3,967,613 | 7/1976 | Rybak et al. | |
| 3,982,476 | 9/1976 | McLane | |
| 3,989,028 | 11/1976 | Berger | |
| 4,037,580 | 7/1977 | Angelo | |
| 4,037,581 | 7/1977 | Trifiletti | |
| 4,094,295 | 6/1978 | Boswell et al. | 99/446 |
| 4,276,869 | 7/1981 | Kern | |
| 4,403,597 | 9/1983 | Miller | |
| 4,430,559 | 2/1984 | Rabay | 99/421 V |
| 4,446,846 | 5/1984 | Hahn | 126/41 R |
| 4,454,805 | 6/1984 | Matthews | 99/400 |
| 4,526,158 | 7/1985 | Lee | |
| 4,539,973 | 9/1985 | Hait | 126/9 R |
| 4,541,406 | 9/1985 | DaSambiagio | |
| 4,574,770 | 3/1986 | Wells | |
| 4,599,938 | 7/1986 | Gongwer | |
| 4,607,609 | 8/1986 | Keating | |
| 4,630,593 | 12/1986 | Gremillion | |
| 4,727,853 | 3/1988 | Stephen et al. | 99/444 |
| 4,773,319 | 9/1988 | Holland | 99/450 |
| 4,800,865 | 1/1989 | Setzer | 99/401 X |
| 4,823,684 | 4/1989 | Traeger et al. | 99/447 |
| 4,840,118 | 6/1989 | Rinehart | 99/450 |
| 4,867,050 | 9/1989 | Patenaude | 99/400 |

FOREIGN PATENT DOCUMENTS 8606602 11/1986 PCT Int'l Appl. ............... 99/447

Primary Examiner—Timothy F. Simone
Attorney, Agent, or Firm—Harness, Dickey & Pierce

[57] ABSTRACT

The grill has separately adjustable left and right grill surfaces and independently controllable left and right burner portions. A removable heat shield impedes heat transfer between the left and right sides, to permit different cooking temperatures at the same time. A slotted heat distribution plate minimizes hot spots on the grill surface while allowing a controlled flare-up to enhance the barbecue flavor.

22 Claims, 6 Drawing Sheets

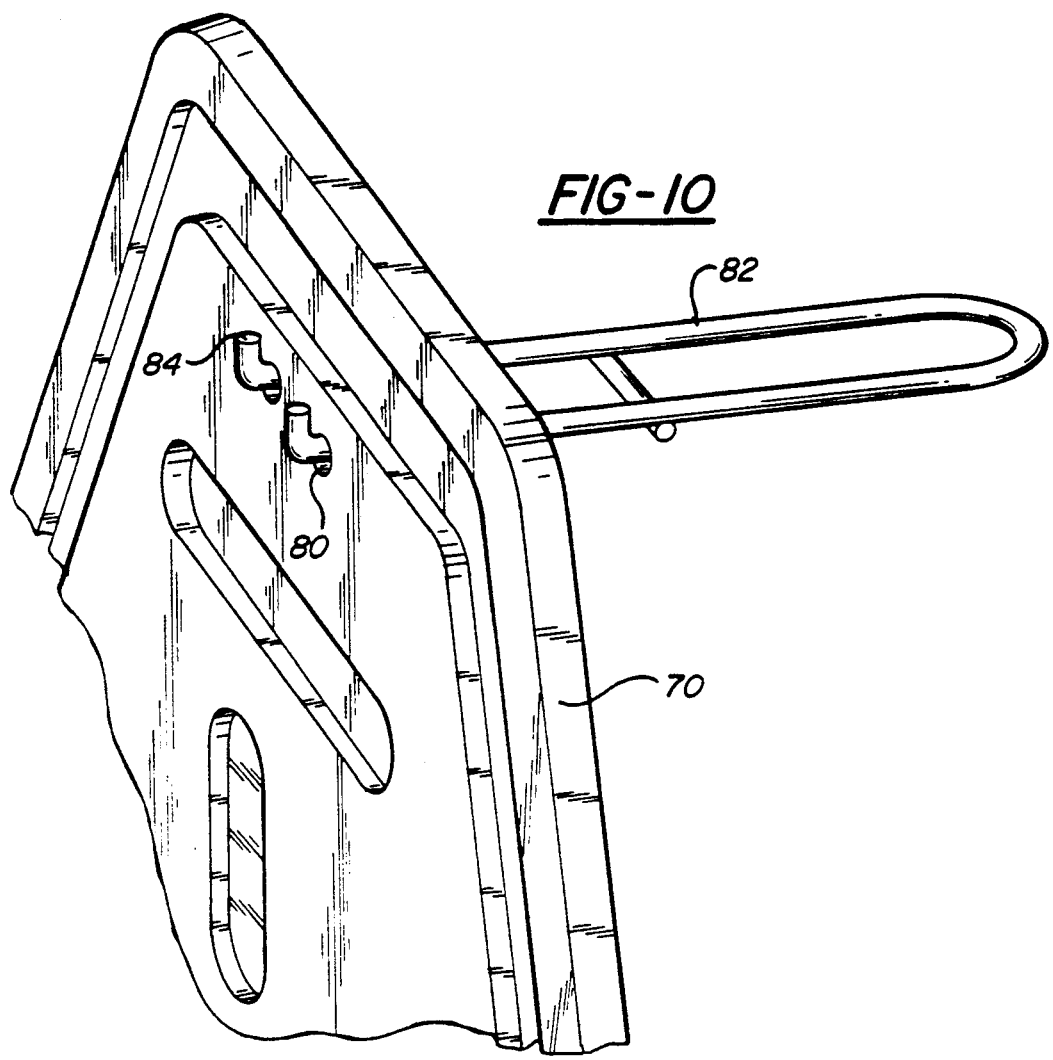
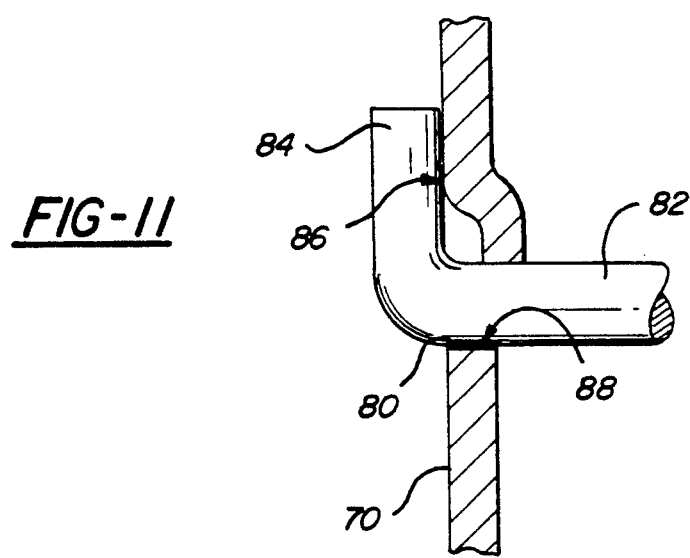

TWO-IN-ONE BARBEQUE GRILL

This is a continuation of U.S. patent application Ser. No. 338,309, filed Apr. 14, 1989, now abandoned.

BACKGROUND OF THE INVENTION

The present invention relates generally to barbecue grills and summer stoves and more particularly to a gas burning grill having separately adjustable left and right grilling surfaces and having a removable heat shield therebetween for impeding heat transfer between the left and right sides. The individual grill sections are independently adjustable in height and cooperate to provide two cooking surfaces having uniform grill rod spacing at either height.

Most gas barbecue grills popular today comprise a metal casting which carries a burner assembly and a cooking grill positioned above the burner assembly. Usually the casting is provided with a hingedly attached lid which can be lowered to create an oven space. Usually fuel is supplied to the burner assembly from a pressurized canister with metering valve to control the fuel flow and thus the heat output.

Anyone who has ever thrown a barbecue party for family or friends knows that one must be prepared to cook a variety of foods ranging from hamburgers and hot dogs to thick-cut steaks and chops and whole chickens or other poultry. The desire to cook different types of foods, which may have widely differing cooking times and temperature requirements, has created a need for an improved barbecue grill capable of simultaneously providing different cooking temperatures. Prior art grills have been generally deficient in this regard, particularly when the lid is closed. With the lid closed, temperatures within the oven space tend to become uniform throughout, notwithstanding the height of the grill cooking surface above the burner.

To overcome the disadvantages of prior art barbecue grills, the present invention employs a heat shield which is removably carried in the lower containment portion defined by the lower casting. The heat shield divides the lower containment casting into left and right portions with individuals left and right grills disposed in each.

The grills are adjustable to different heights above the burner assembly. Each grill comprises a plurality of parallel rods spaced a predetermined distance apart and extending generally front to rear relative to the lower containment casting. At each height, the rods of each grill extend front to rear, thereby facilitating the use of spatula cooking implements.

The heat shield is held in place by a supporting fixture which defines a generally vertically arranged slot for receiving and supporting the heat shield. The supporting fixture has a horizontally disposed cooking surface which cooperates with the left and right cooking grills so that when the left and right grills are positioned side by side and adjacent the supporting fixture cooking surface, both the grills and the cooking surface lie in a common horizontal plane characterized by parallel rods of equal spacing. When the heat shield is removed and the left and right grills are positioned parallel to one another and above the cooking surface of the supporting fixture, the same inter-rod spacing is maintained. The left and right grills can also be placed at different heights to define two different horizontal planes, if desired.

The heat shield comprises a pair of plates which, when installed in the supporting fixture, are held to define an insulating air space between. The plates may be removed, even while hot, by a detachable lifting tool for storage beneath the framework which supports the containment casting at the cooking height. The heat shield plates are of the appropriate size and shape to substantially conform to the lower containment casting and also to the upper lid, to thereby divide the oven space into two. The plates may be removed and placed upon the grill surfaces where they aid in cleaning the cooking surface by reflecting and conducting heat onto the cooking surface.

For a more complete understanding of the invention, its objects and advantages, reference may be had to the following specification and to the accompanying drawings.

BRIEF DESCRIPTION OF THE DRAWINGS

FIGS. 10 and 11 depict the lifting tool of the invention.

DESCRIPTION OF THE PREFERRED EMBODIMENTS

Figure 1:
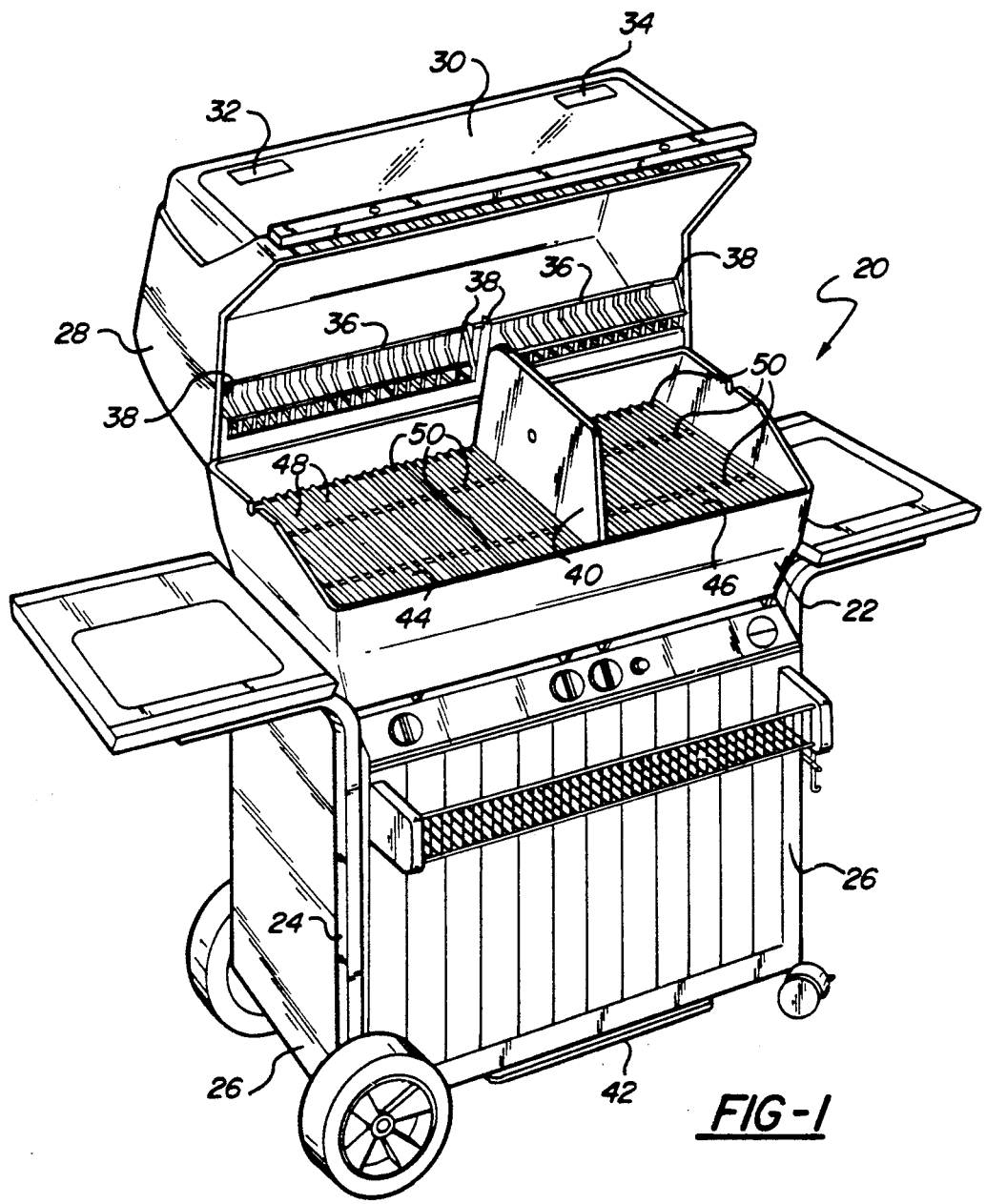
FIG. 1 is a perspective view of the barbecue grill of the invention, showing heat shield installed between the left and right portions of the lower containment casting.

Reffereing to FIG. 1, the two-in-one barbecue grill is illustrated generally at 20. The barbecue grill comprises a lower containment casting 22, preferably of cast aluminum. Casting 22 is supported on a metal framework 24 which supports the grill at a suitable height for use by a standing user. If desired, the framework may include panel members 26 of wood or other suitable material for enclosing the space beneath the lower containment casting. This enclosed space may be used to house fuel canisters and cooking utensils, if desired.

Hingedly attached to the lower containment casting is an upper containment casting or lid 28. Preferably, lid 28 includes a heat-resistant window 30 to which left and right thermometers 32 and 34 are affixed. Lid 28 is adapted to mate tightly with the upper periphery of lower containment casting 22. When lid 28 is closed to mate with the lower containment casting, the lower containment casting and lid define a substantially enclosed oven space. As illustrated in FIG. 1, if desired, the lid may be provided with a pair of swing-away baskets 36 which are pivotally suspended as at 38 to allow the baskets to seek a level position regardless of whether lid 28 is open or closed.

The two-in-one barbecue grill includes a heat shield 40 which is removably carried in the lower containment casting in a generally vertical orientation. The heat shield is of a size and shape to substantially conform to the inner sidewalls of the upper (lid) and lower containment castings to thereby divide the over space into two approximately equal half portions. As will be discussed more fully below, the heat shield 40 is removable when it is desired not to subdivide the oven space into two. A wire mounting rack 42 is provided at the bottom of the framework 24 for receiving and storing the heat shield 40 when it is not in use.

Barbecue grill 20 further comprises left and right grill members 44 and 46 which define cooking surfaces upon which food may be placed. Both grill members comprise a plurality of parallel grill rods 48 which extend from the front to the rear of lower containment casting 22. The grill rods are preferably equally spaced a predetermined distance apart and are secured together by means of cross members 50.

Figure 2:
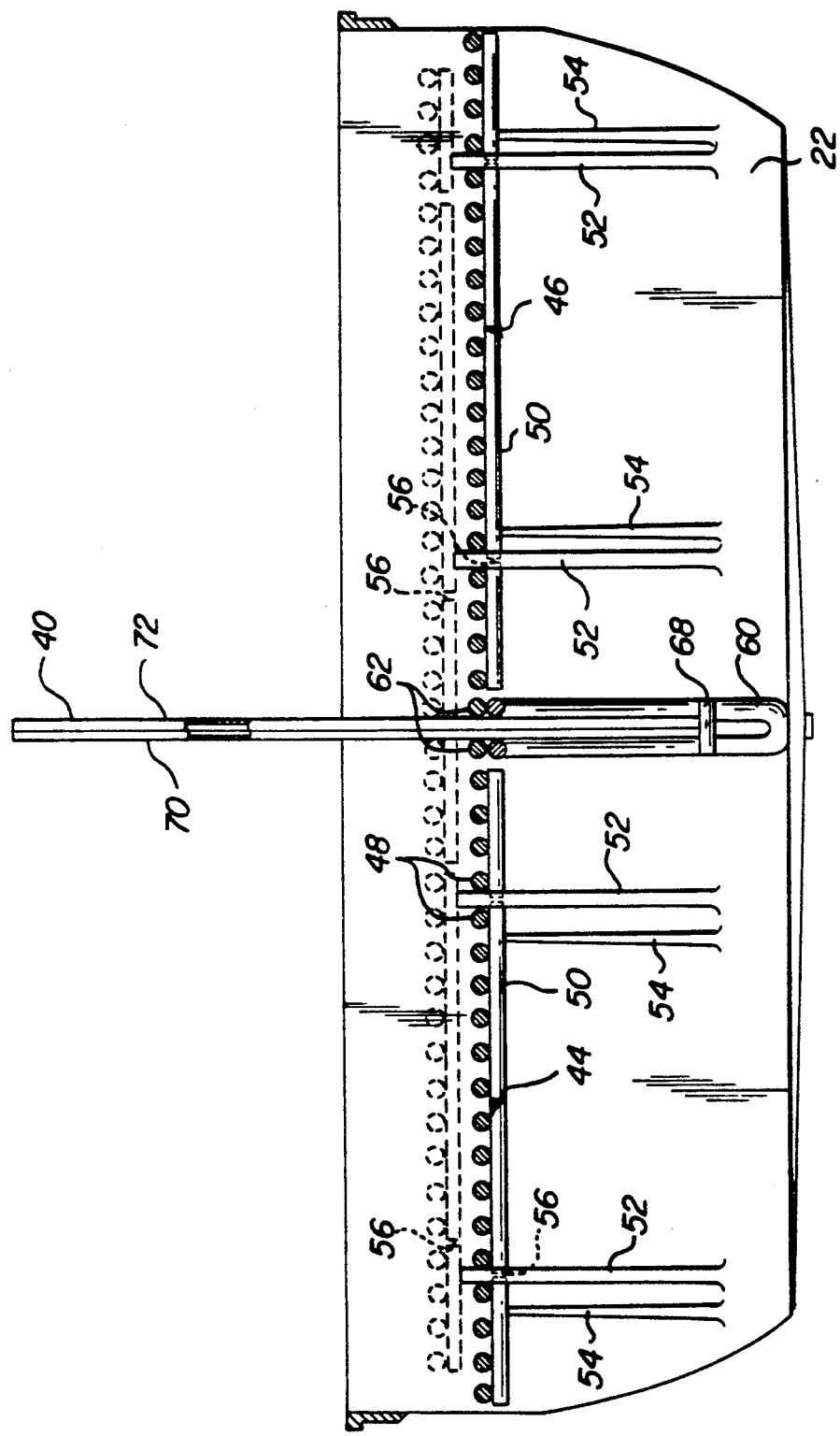
FIG. 2 is a vertical cross-sectional view through the lower casting, showing the heat shield in elevation.

The left and right grill members are adjustable to different heights of grill support structures 52 and 54, shown in FIG. 2. The grill support structures 52 and 54 are preferably integrally cast with the lower containment casting 22. Both structures 52 and 54 provide resting surfaces at the uppermost extremities on which the left and right grill members 44 and 46 may be placed. In the presently preferred embodiment the cross members 50 adjacent the ends of grill rods 48 rest upon the grill support structures.

Figure 5:
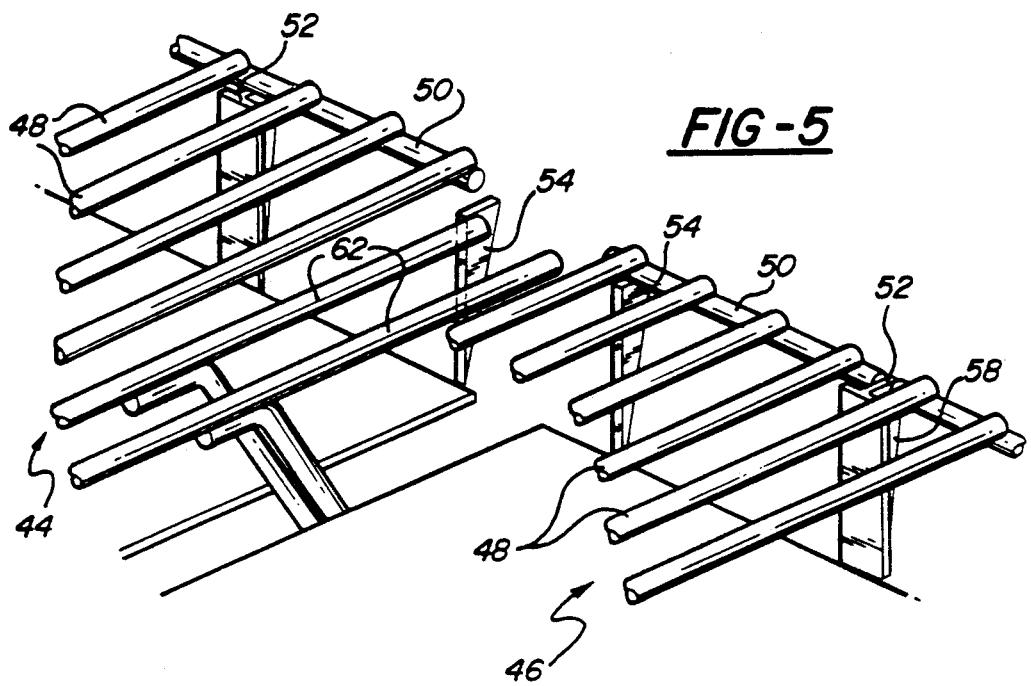
FIG. 5 is a detailed perspective view illustrating the left and right grill support means and also illustrating the cooking surface defined by the supporting fixture.
Figure 6:
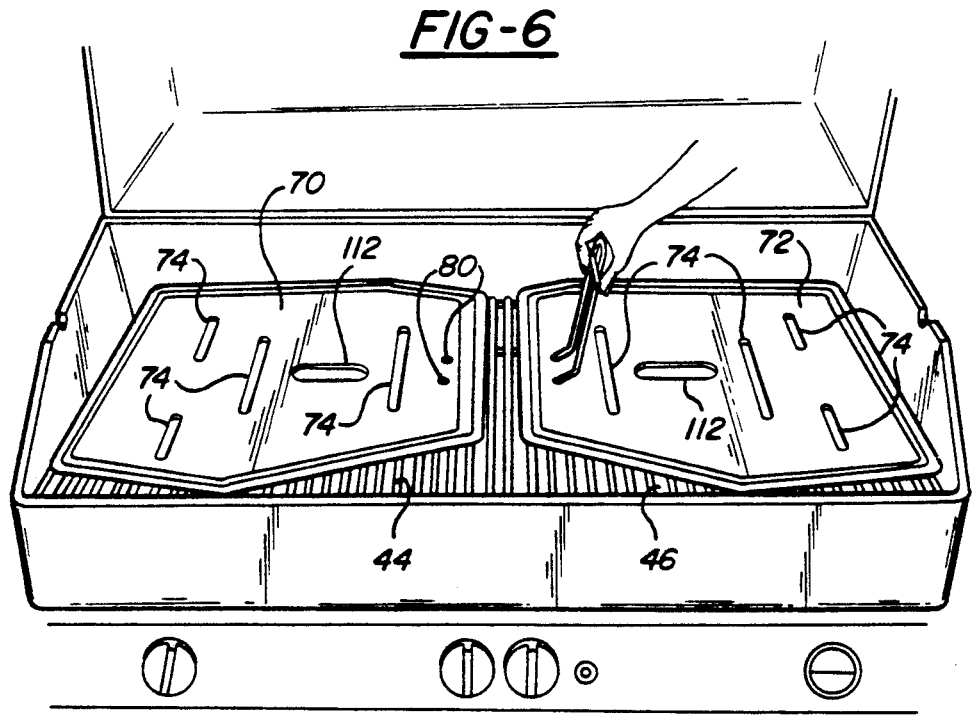
FIG. 6 illustrates the heat shields in place during self-cleaning.

With continued reference to FIG. 2 and reference to FIG. 5, the grill support structures 52 and 54 defined resting surfaces which lie in two generally horizonal planes, an upper plane defined by upper support structures 52 and a lower plane defined by support structures 54. Lower grill support structures 54 are preferably rectangular in cross section, whereas upper support structures 52 are preferably T-shaped in cross section. As seen in FIG. 2, the endmost cross members 50 have slots 56 for slidably receiving the base portion 58 of the T-shaped support structures 52 when the corresponding grill member is in the lower position, resting upon lower support structures 54. When the upper grill position is desired, the entire grill assembly is moved laterally toward the center line defined by heat shield 40 so that slots 56 are no longer in registration with base 56 of grill support structure 52. In this laterally disposed position the cross members may rest upon the base 56 of support structure 52. FIG. 6 depicts the left grill member 48 in the upper position, resting upon support structure 52, and the right grill member 46 in the lower position resting upon lower support structure 54. In FIG. 2 both left and right grill members are shown in solid lines in the lower position and in dotted lines in the upper position.

Figure 3:
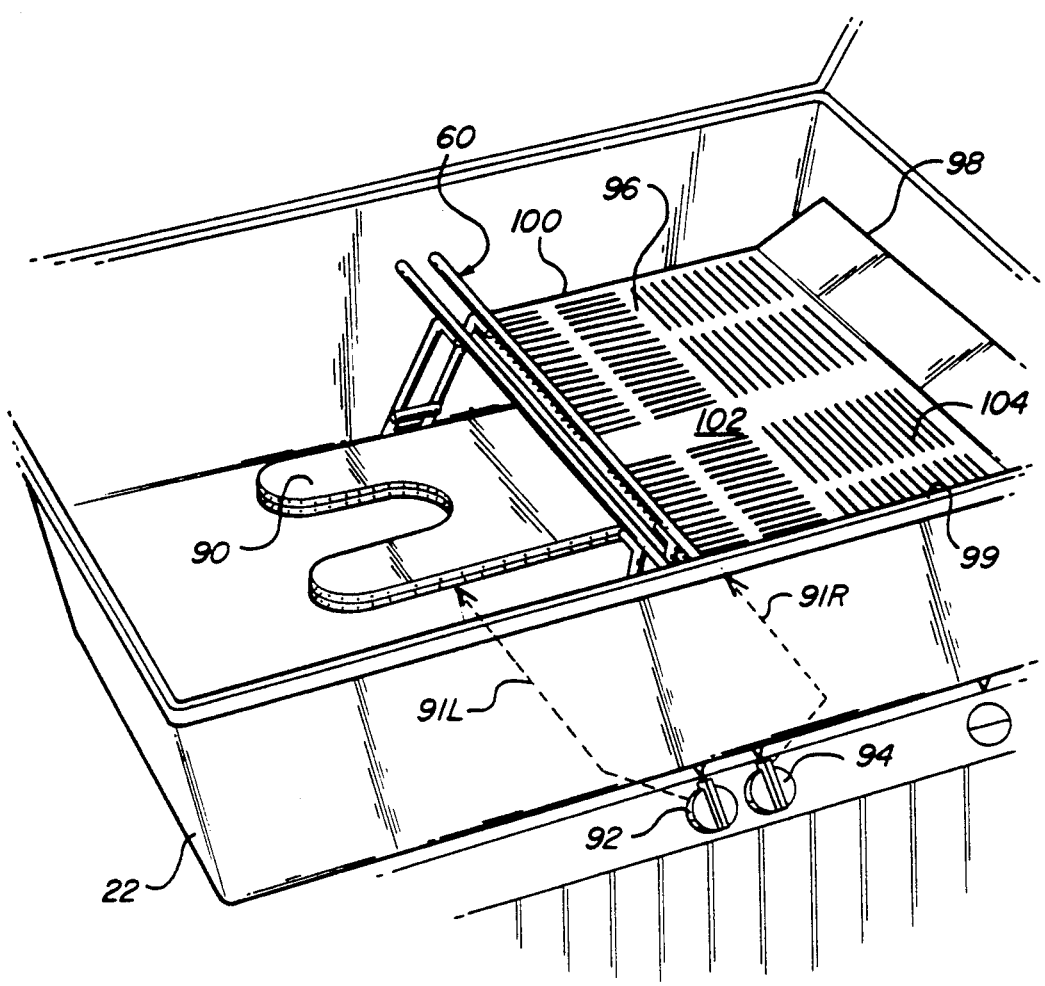
FIG. 3 is a close-up view of the heat distribution plates disposed in the lower casting.
Figure 4:
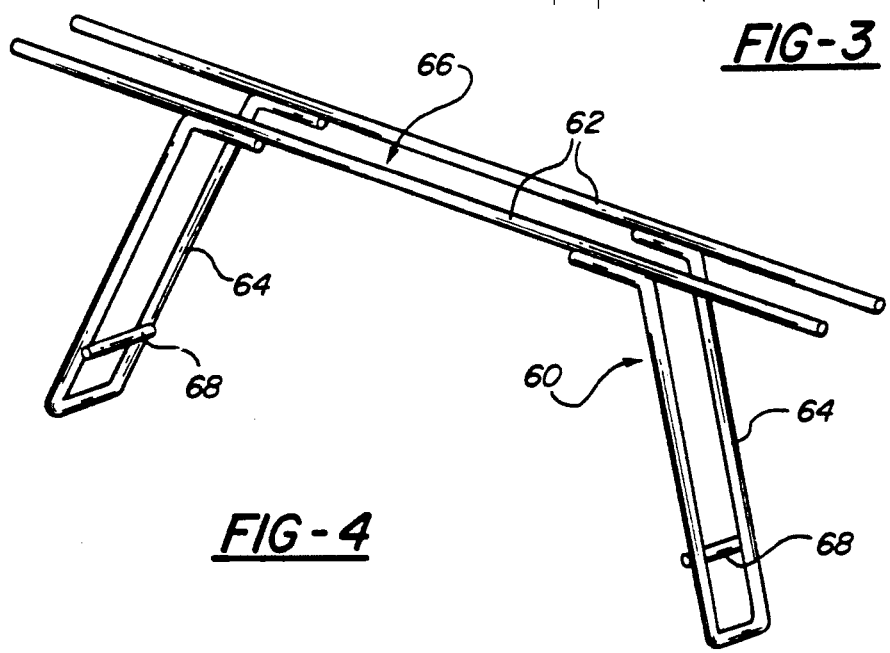
FIG. 4 is perspective view of the supporting fixture.

In order to support the heat shield in its vertically upright position of use a support fixture 60 is provided. Fixture 60 is shown in FIGS. 2, 3 and 4. FIG. 2 heat shield 40 is installed in the position of use. In FIG. 3 the heat shield is removed, revealing the supporting fixture 60 in greater detail. FIG. 4 is a perspective view of the supporting fixture removed from lower containment casting 22. Referring to FIG. 4, the supporting fixture comprises a pair of parallel rods 62 which are supported on two generally U-shaped brackets 64 which serve as legs to support rods 62 at a perdetermined height above the lower containment casting floor. As shwon in FIG. 2, parallel rods 62 are at the same height as the grill rods 48 in the lower position. The parallel rods 62 are spaced apart a predetermined distance generally equal to the inter-rod spacing of the grill members. The spaced apart rods 62 and brackets 64 thus define a slot 66 for receiving the heat shield 40. At the lowermost ends of brackets 64 are a pair of crossbars 68 on which the lowermost edge of the heat shield rests in use. The crossbars are at a height above the floor of lower containment casting 22 to elevate the heat shield sufficiently to closely conform at its upper periphery with the lid 28 when closed.

With reference to FIGS. 2 and 5, it will be seen that the parallel rod 62 of supporting fixture 60 lie in the plane of grill rods 48 in the lower position and are spaced apart the same as the grill rods so that the grill members and parallel rods 62 define a single horizontal cooking surface characterized by parallel rods extending front to rear. When the grill members are both placed at the upper position (with heat shield 40 removed and with left and right members laterally positioned as described above) a continuous horizontal cooking surface is again defined. Thus with heat shield 40 removed, a large and continuous cooking surface can be provided at either cooking height, all grill rods 48 and parallel rods 62 (if used) being of equal spacing and extending front to rear. The result is a cooking surface which does not have large gaps through which food may fall and the rods extending front to rear facilitating the use of spatula cooking implements. With rods extending front to rear a spatula can be slid in contact with the rods from front to rear in turning foods without becoming caught between the inter-rod spaces.

The heat shield 40 of the presently perferred embodiment actually comprises a pair of heat shield plates 70 and 72. The plates, in use as a heat shield, are placed side by side in slot 66, generally as illustrated in FIG. 2. The plates 70 and 72 may be removed and placed directly upon the cooking surfaces of grill members 44 and 46, where they serve to concentrate and reflect heat onto the cooking surface to burn away fats and other food substances. From FIG. 6, the presently preferred size and shape of heat shield plates 70 and 72 can be seen. In general, the peripheral shapes are configured to closely conform to the inner periphery of the lower containment casting 22 and lid 28. The plates are provided with embossed raised areas 74, both around the periphery and in the mid-portions. These raised areas increase the structural rigidity of the heat shield plates, minimizing the tendency for the plates to warp or cant when subjected to heat. Moreover, the raised areas prevent the heat shield plates from contacting one another at all points, thereby defining an air space 76 therebetween. This air space aids in impeding heat transfer between the left and right-hand sides of the oven space defined by the containment casting 22 and lid 28. The heat shield plates are also provided each with a pair of holes 80 for detachably receiving a lifting tool 78 used in lifting the plates when hot. As shown in FIG. 10, lifting tools 78 comprises a rebent wire handle 82 having a pair of upturned ends 84 which pass through holes 80 in the heat shield plate such as heat shield 70. The detail in FIG. 11 illustrates the manner in which the lifting tool operates. After the user has inserted the upturned end 84 through holes 80 the handle 82 is pivoted downwardly causing the upturned ends to contact the face of plate 70 as at 86. This movement also causes the handle portion 82 to contact the heat shield plate along the bottom of hole 80 as at 88. The heat shield plate is lifted by lifting handle 82 while maintaining handle 82 slightly downwardly inclined to cause wedging contact at points 86 and 88. In this way, the hot heat shield plate can be lifted with positive control.

Referring to FIG. 3, disposed adjacent the floor of lower containment casting 22 is a gas burner assembly 90. A burner assembly is bilaterally symmetrical about the center line defined by the heat shield. The left and right sides of burner assembly 90 are separately supplied with fuel by left and right feed conduits (shown diagrammatically as 91L and 91R). Fuel is metered to these conduits by left and right valves 92 and 94. By adjusting valves 92 and 94 the amount of heat produced by the left and right sides of burner assembly 90 can be independently regulated. For example, if only the left-hand side of the grill is being used, the right-hand valve 94 can be turned completely off.

Disposed above burner assembly 90 is a heat distribution plate 96. The heat distribution plate comprises a stamped metal generally horizontal plate with upwardly and outwardly flared edge 98. The edge 98 as well as front and rear edges 99 and 100 are spaced from the sidewalls of lower containment casting 22 to allow heat to flow around the distribution plate and into the upper oven space defined by the lid 28. The heat distribution plate includes a horizontal section which has a plurality of slots 104 stamped therein. One objective of the heat distribution plate is to eliminate hot spots on the cooking surface of the grill and to provide a more uniform heat across the entire cooking surface. During experimentation in arriving at the presently preferred embodiment, it was discovered that a heat distribution plate without slots provided good heat uniformity, but tended to produce a baked rather than grilled flavor. It was discovered that the grilled flavor associated with barbecue grills is at least in part due to the smoke and flare-ups produced by the burning of dripping fats from the food being cooked. While this smoke and flare-up does contribute to the barbecued flavor, excessive flare-up can be problematic, causing the food to taste burnt and creating unwanted smoke residue on the food, cooking surfaces and grill interior. The presently preferred embodiment employs a heat distribution plate with controlled flare-up, producing the desired barbecued flavor without excessive flare-up and smoke. The presently preferred embodiment employs slots arranged in the pattern illustrated in FIG. 3, the slots being approximately 2.00 inches long, 0.12 inches wide and being spaced 0.5 inches apart. The presently preferred percentage of slot area to horizontal section 102 surface area is about 12%.

Figure 7:
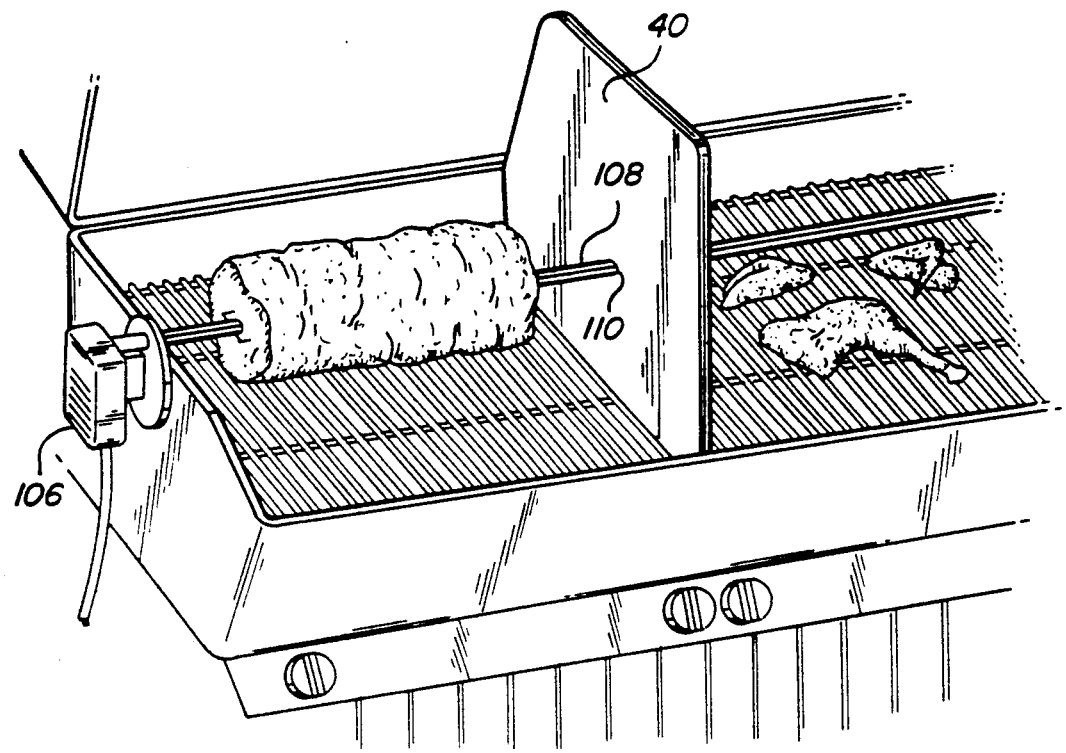
FIG. 7 is a perspective view illustrating a rotisserie arrangement utilizing the heat shield as a center spit rod support.

The two-in-one barbecue grill is also capable of being used with a rotisserie. In this regard, FIG. 7 illustrates rotisserie 106 with spit rod 108 extending through heat shield 40. If desired, heat shield 40 may be configured, as shown in FIG. 7, to include a hole 110 through which spit rod 108 passes. In this embodiment, hole 110 serves as the journal surface for supporting the spit rod at its mid-point. Such an arrangement may be used with spit rods which are not sufficiently rigid to span the entire length of the grill without sagging. In the alternative, with sufficiently rigid spit rods, hole 110 can be replaced by an elongated slot, such as slot 112 illustrated in FIG. 6. The elongated slot 112 is sized to permit spit rod 108 to pass through without contacting the heat shield 40.

Figure 8:
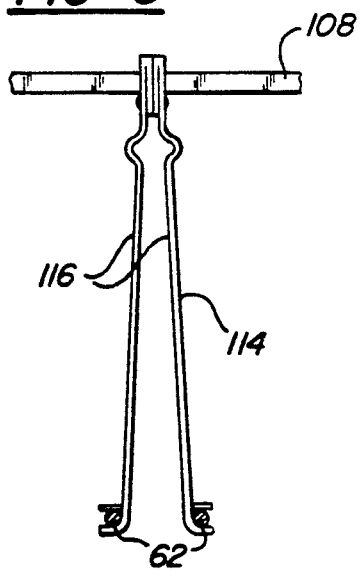
FIG. 8 is a cross-sectional view illustrating a detachable support clip attached to the supporting fixture for supporting a rotisserie spit rod at its middle.
Figure 9:
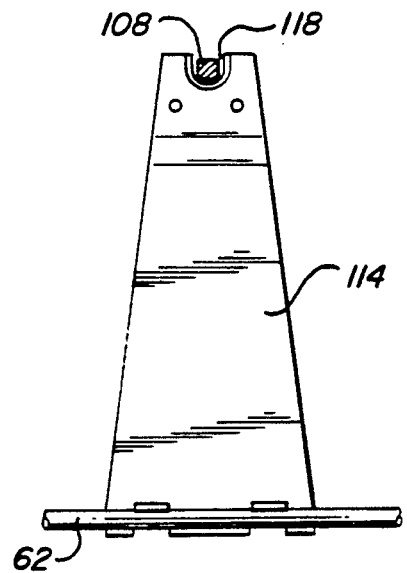
FIG. 9 is a side view of the support clip of FIG. 8.

In some instances, it may be desired to use a rotisserie without heat shield 40 installed, a detachable support clip 114, such as illustrated in FIGS. 8 and 9, may be used. The support clip comprises a pair of spring steel legs attached at the top by rivets and defining a U-shaped cradle 118 for supporting the spit rod 108. The lowermost ends of legs 116 are adapted to clip onto the parallel rods 62 of supporting fixture 60. Legs 116 are squeezed together and placed between rods 62 and then released. The spring tension of the legs in returning to the original spread apart position holds the clip securely in place.

From the foregoing, it will be understood that the present invention provides a two-in-ones grill having a great deal of versatility. The grill can be used for large barbecues by removing the heat shield and placing both left and right grill members in a common plane. In the alternative, the heat shield can be installed and the left and right grill members can be set at the same or at different heights to suit the foods being cooked. The heat on the left and right sides can be independently controlled by appropriate setting of left and right valves 92 and 94, with the heat shield serving to impede heat transfer between the left and right sides. In this way, it is possible to simultaneously maintain a cooking temperature on the left side that is considerably different from that on the right side.

While the invention has been illustrated and described in its presently preferred embodiments, the invention is capable of modification without departing from the spirit of the invention as set forth in the appended claims.

What is claimed is:

1. A barbecue grill comprising:
   a lower containment means;
   an open flame gas burning heat source disposed in said containment means;
   a heat distribution plate disposed generally above said heat source and within said lower containment means;
   a cooking grid supported on said lower containment means and disposed generally above said heat distribution plate, said cooking grid providing a cooking surface which defines a generally horizontal plane for supporting food being cooked and having a plurality of openings through which liquified fats may drip during cooking;
   said heat distribution plate comprising a heat conducting metal sheet which has a midportion and at least two opposing edges which are spaced from said lower containment means and which are upwardly and outwardly flared such that said opposing edges are closer to said cooking grid than the midportion of said heat distribution plate;
   said heat distribution plate being operable to conduct heat from said midportion to said opposing edges and thereby tending to distribute heat relatively uniformly to said cooking grid.

2. The grill of claim 1 wherein said heat distribution plate comprises at least one stamped sheet metal plate.

3. The grill of claim 1 wherein said heat distribution plate comprises two separate sheet metal plates.

4. The grill of claim 3 wherein said two separate sheet metal plates define mirror images of one another.

5. The grill of claim 1 wherein said heat distribution plate defines a generally rectangular shape and wherein said opposing edges are parallel with the widthwise dimension of said rectangular shape.

6. The grill of claim 1 wherein said lower containment means has sidewalls and wherein the periphery of said heat distribution plate is spaced away from the sidewalls of said lower containment means.

7. A barbecue grill comprising:
   a lower containment means;
   an open flame gas burning heat source disposed in said containment means;
   a heat distributin plate disposed generally above said heat source and within said lower containment means;
   a cooking grid supported on said lower containment means and disposed generally above said heat distribution plate, said cooking grid providing a cooking surface which defines a generally horizontal plane for supporting food being cooked and having a plurality of openings through which liquified fats may drip during cooking;
   said heat distribution plate comprising a heat conducting metal sheet which has a midportion and at least two opposing edges which are spaced from said lower containment means and which are upwardly and outwardly flared such that said opposing edges are closer to said cooking grid than the midportion of said heat distribution plate;
   said heat distribution plate having a plurality of apertures therein;
   said heat distribution plate being operable to conduct heat from said midportion to said opposing edges and thereby tending to distribute heat relatively uniformly to said cooking grid; and
   said apertures in said heat distribution plate being so adapted and arranged to permit a controlled flare-up by ignition of fat dripping whereby grilled flavor is imparted to the food being cooked.

8. The grill of claim 7 wherein said heat distribution plate comprises at least one stamped sheet metal plate.

9. The grill of claim 7 wherein said heat distribution plate comprises two separate sheet metal plates.

10. The grill of claim 9 wherein said two separate sheet metal plates define mirror images of one another.

11. The grill of claim 7 wherein said heat distribution plate defines a generally rectangualr shape and wherein said opposing edges are parallel with the widthwise dimension of said rectangular shape.

12. The grill of claim 7 wherein said lower containment means has sidewalls and wherein the periphery of said heat distribution plate is spaced away from the sidewalls of said lower containment means.

13. The grill of claim 7 wherein at least some of said apertures comprise elongated slots.

14. The grill of claim 7 wherein said heat distribution plate comprises at least one stamped sheet metal plate and wherein said apertures are formed by stamping.

15. A bargecue grill comprising:
   a lower containment means;
   an open flame gas burning heat source disposed in said containment means;
   a heat distribution plate disposed generally above said heat source and within said lower containment means;
   a cooking grid supported on said lower containment means and disposed generally above said heat distribution plate, said cooking grid providing a cooking surface which defines a generally horizontal plane for supporting food being cooked and having a plurality of openings through which liquified fats may drip during cooking;
   said heat distribution plate comprising a heat conducting metal sheet which has a midportion and at least two opposing edges which are spaced from said lower containment means and which are upwardly and outwardly flared such that said opposing edges are closer to said cooking grid than the midportion of said heat distribution plate;
   said heat distribution plate having a plurality of apertures therein;
   said heat distribution plate being operable to conduct heat from said midportion to said opposing edges and thereby tending to distribute heat relatively uniformly to said cooking grid; and
   said appertures in said heat distribution plate defining an area less than about 15% of the area defined by said heat distribution plate and being so adapted and arranged to permit a controlled flare-up by ignition of fat dripping whereby grilled flavor is imparted to the food being cooked.

16. The grill of claim 15 wherein said heat distribution plate comprises at least one stamped sheet metal plate.

17. The grill of claim 15 wherein said heat distribution plate comprises two separate sheet metal plates.

18. The grill of claim 17 wherein said two separate sheet metal plates define mirror images of one another.

19. The grill of claim 15 wherein said heat distribution plate defines a generally rectangular shape and wherein said opposing edges are parallel with the widthwise dimension of said rectangular shape.

20. The grill of claim 15 wherein said lower containment means has sidewalls and wherein the periphery of said heat distribution plate is spaced away from the sidewalls of said lower containment means.

21. The grill of claim 15 wherein at least some of said apertures comprise elongated slots.

22. The grill of claim 15 wherein said heat distribution plate comprises at least one stamped sheet metal plate and wherein said apertures are formed by stamping.

* * * * *